US011946302B2

(12) United States Patent
Ireland et al.

(10) Patent No.: US 11,946,302 B2
(45) Date of Patent: Apr. 2, 2024

(54) HOME APPLIANCE

(71) Applicant: SAMSUNG ELECTRONICS CO., LTD., Suwon-si (KR)

(72) Inventors: Simon Ireland, Suwon-si (KR); Yu Na Park, Suwon-si (KR); Deok Sang Yun, Suwon-si (KR); Gi Hoon Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 399 days.

(21) Appl. No.: 17/297,722

(22) PCT Filed: Nov. 14, 2019

(86) PCT No.: PCT/KR2019/015520
§ 371 (c)(1),
(2) Date: May 27, 2021

(87) PCT Pub. No.: WO2020/111599
PCT Pub. Date: Jun. 4, 2020

(65) Prior Publication Data
US 2022/0025689 A1 Jan. 27, 2022

(30) Foreign Application Priority Data
Nov. 28, 2018 (KR) ........................ 10-2018-0150197

(51) Int. Cl.
*E05F 1/10* (2006.01)

(52) U.S. Cl.
CPC ............. *E05F 1/10* (2013.01); *E05Y 2900/30* (2013.01)

(58) Field of Classification Search
CPC ..... E05D 15/50; E05D 15/502; E05D 15/507; E05F 1/10; E05Y 2900/30
See application file for complete search history.

(56) References Cited

U.S. PATENT DOCUMENTS 972,639 A * 10/1910 Pians .................... E05D 15/502 16/326
2,885,723 A * 5/1959 Altmann ............... E05D 15/502 292/333
(Continued)

FOREIGN PATENT DOCUMENTS

EP 0 844 354 5/1998
EP 1 953 483 8/2008
(Continued)

OTHER PUBLICATIONS

International Search Report dated Mar. 18, 2020 from International Application No. PCT/KR2019/015520.
(Continued)

*Primary Examiner* — Matthew W Ing
(74) *Attorney, Agent, or Firm* — STAAS & HALSEY LLP

(57) ABSTRACT

A home appliance has a door capable of being opened and closed in opposite directions. The home appliance includes a main body having an inner space and a door rotatably installed on the right or left side of the main body to open and close the inner space. A first door opening/closing system is provided on the right sides of the main body and the door to be involved in a right opening of the door. A second door opening/closing system is provided on the left sides of the main body and the door to be involved in a left opening of the door. A locking member is disposed to be slidable in a left-right direction between the first door opening/closing system and the second door opening/closing system.

15 Claims, 19 Drawing Sheets

(56) References Cited

U.S. PATENT DOCUMENTS

| | | | | |
|---|---|---|---|---|
| 5,148,629 | A | 9/1992 | Minami | |
| 7,913,355 | B2 | 3/2011 | Choi | |
| 2004/0256859 | A1* | 12/2004 | Yamada | E05B 83/30<br>292/32 |
| 2006/0196120 | A1* | 9/2006 | Yamada | H02B 1/38<br>49/193 |

FOREIGN PATENT DOCUMENTS

| | | |
|---|---|---|
| GB | 2 261 257 | 5/1993 |
| JP | 3-75479 | 3/1991 |
| JP | 5-302462 | 11/1993 |
| JP | 7-197733 | 8/1995 |
| JP | 2000-64707 | 2/2000 |
| JP | 6063694 | 1/2017 |
| KR | 1999-0029441 | 7/1999 |
| KR | 20-0202042 | 11/2000 |
| KR | 20-0253873 | 1/2002 |
| KR | 2002-0090999 | 12/2002 |
| KR | 20-0308358 | 3/2003 |
| KR | 20-0332937 | 11/2003 |
| KR | 10-2008-0069434 | 7/2008 |

OTHER PUBLICATIONS

Office Action issued in corresponding Korean application No. 10-2018-0150197 dated Mar. 27, 2023.

* cited by examiner

HOME APPLIANCE

TECHNICAL FIELD

The present disclosure relates to a home appliance, and more particularly, to a home appliance having a door capable of being opened and closed in opposite directions.

BACKGROUND ART

An inner space of a home appliance may be opened and closed by a door. As an example, in the case of home appliances such as washing machines and a dryers, an inner space in which laundry or an object to be dried is accommodated may be opened and closed by a door. As another example, in the case of home appliances such as refrigerators and ovens, an inner space in which food is stored or cooked may be opened and closed by a door.

In general, a door may be installed on one side of a home appliance so that the door may be opened and closed in only one direction. As such, in the case where a door may be opened and closed only in one direction, when a situation occurs in which the door need to be opened or closed in a different direction as necessary or depending on an installation space, the door may not be opened and closed, so that the use of the home appliance may be limited.

DISCLOSURE

Technical Problem

The present disclosure is directed to providing a home appliance having a door capable of being opened and closed in opposite directions to improve the usability.

The present disclosure is directed to providing a home appliance with an improved structure to easily change an opening/closing direction of the door.

Technical Solution

An aspect of the present disclosure provides a home appliance including a main body having an inner space, a door rotatably installed on the right or left side of the main body to open and close the inner space, a first door opening/closing system provided on the right sides of the main body and the door to be involved in a right opening of the door, a second door opening/closing system provided on the left sides of the main body and the door to be involved in a left opening of the door, and a locking member disposed to be slidable in a left-right direction between the first door opening/closing system and the second door opening/closing system to prevent the left opening of the door when the first door opening/closing system is operated and to prevent the right opening of the door when the second door opening/closing system is operated, wherein each of the first door opening/closing system and the second door opening/closing system includes a handle rotatably installed on the right side or the left side of the door, and a moving member configured to move in an up-down direction by being interlocked with the handle and provided to enable the locking member to be coupled thereto.

Each of the first door opening/closing system and the second door opening/closing system may further include a fixing bracket installed on the right side or the left side of the main body, and the moving member may move in the up-down direction by being interlocked with the handle to be selectively coupled to the fixing bracket.

The fixing bracket may include a bracket body fixedly installed on the main body, and an arm extending forward from the bracket body to be exposed to the outside of the main body and having a coupling hole.

The moving member may include a protrusion provided to be selectively coupled to the coupling hole.

The protrusion of the moving member may be coupled to the coupling hole of the fixing bracket to form a rotating axis of the door.

When the handle is rotated toward the front, the protrusion of the moving member may be separated from the coupling hole of the fixing bracket so that the door is openable from the right side or the left side.

The locking member may include a first locking member to prevent the right opening of the door and a second locking member to prevent the left opening of the door, the first door opening/closing system may include a first locking inducing member provided to move the second locking member toward the second door opening/closing system by integrally rotating with the door when the right side of the door is opened, and the second door opening/closing system may include a second locking inducing member provided to move the first locking member toward the first door opening/closing system by integrally rotating with the door when the left side of the door is opened.

The first locking member and the second locking member may independently move by being disposed to cross each other.

When the right side of the door is opened, the second locking member may be coupled to the moving member of the second door opening/closing system to prevent the moving member of the second door opening/closing system from moving in the up-down direction by being pressed by the first locking inducing member, and when the left side of the door is opened, the first locking member may be coupled to the moving member of the first door opening/closing system to prevent the moving member of the first door opening/closing system from moving in the up-down direction by being pressed by the second locking inducing member.

One end of the first locking member may be provided to be movable along a guide surface formed on the second locking inducing member and the other end of the first locking member may be provided to be selectively coupled to the moving member of the first door opening/closing system, and one end of the second locking member may be provided to be movable along a guide surface formed on the first locking inducing member and the other end of the second locking member may be provided to be selectively coupled to the moving member of the second door opening/closing system.

The first locking inducing member may include a contact surface provided to be inclined to be guided by being in contact with the arm of the fixing bracket of the first door opening/closing system when the right side of the door is opened and closed, and the second locking inducing member may include a contact surface provided to be inclined to be guided by being in contact with the arm of the fixing bracket of the second door opening/closing system when the left side of the door is opened and closed.

The handle may include a coupling part provided to interfere with a protrusion of the moving member, the coupling part may include a first section and a second section extending from the first section to be inclined downward, and the protrusion of the moving member may be located in the first section of the coupling part by moving along the second section when the handle is rotated toward the front.

Each of the first door opening/closing system and the second door opening/closing system may further include an elastic member disposed between the handle and the moving member to be elastically deformable according to the movement of the moving member.

Each of the first door opening/closing system and the second door opening/closing system may further include an elastic body coupled to the first locking inducing member or the second locking inducing member to be elastically deformable according to the movement of the first locking inducing member or the second locking inducing member.

Another aspect of the present disclosure provides a home appliance including a main body having an inner space, a door rotatably installed on the right or left side of the main body to open and close the inner space, a first door opening/closing system provided on the right sides of the main body and the door to be involved in a right opening of the door, a second door opening/closing system provided on the left sides of the main body and the door to be involved in a left opening of the door, a locking member disposed on the door to be slidable in a left-right direction between the first door opening/closing system and the second door opening/closing system, and an additional locking member disposed on the main body to be slidable in a direction opposite to the locking member to prevent the left opening of the door together with the locking member when the first door opening/closing system is operated and to prevent the right opening of the door together with the locking member when the second door opening/closing system is operated.

Each of the first door opening/closing system and the second door opening/closing system may include a handle rotatably installed on the right side or the left side of the door.

Each of the first door opening/closing system and the second door opening/closing system may include a catch member installed on the right side or the left side of the main body to move in an up-down direction, and a lever unit provided on the door to selectively interfere with the catch member, wherein the lever unit may include a lever casing, and a lever rotatably disposed inside the lever casing such that a portion of the lever is located outside the lever casing.

Each of the first door opening/closing system and the second door opening/closing system may further include a rotation member rotatably disposed by being interlocked with the handle, and the rotation member may press the lever of the lever unit so that interference between the catch member and the lever unit is released when the handle is rotated toward the front.

The locking member may include a first locking member to prevent the right opening of the door and a second locking member to prevent the left opening of the door, the rotation member of the first door opening/closing system may be configured to move the second locking member toward the second door opening/closing system so that the second locking member interferes with the handle of the second door opening/closing system when the handle is rotated toward the front, and the rotation member of the second door opening/closing system may be configured to move the first locking member toward the first door opening/closing system so that the first locking member interferes with the handle of the first door opening/closing system when the handle is rotated toward the front.

The additional locking member may include a first additional locking member to prevent the right opening of the door together with the first locking member, and a second additional locking member to prevent the left opening of the door together with the second locking member, when the left side of the door is opened, the first additional locking member may move toward the second door opening/closing system so that one end of the first additional locking member interferes with a catch member of the first door opening/closing system, and when the right side of the door is opened, the second additional locking member may move toward the first door opening/closing system so that one end of the second additional locking member interferes with a catch member of the second door opening/closing system.

Advantageous Effects

Through a first door opening/closing system involved in a right opening of a door, a second door opening/closing system involved in a left opening of the door, and a locking member disposed between the first door opening/closing system and the second door opening/closing system to prevent the right opening of the door and the left opening of the door from being operated at the same time, opening and closing directions of the door can be easily changed, and the door can be prevented from being completely separated from a main body in the process of changing the opening and closing directions of the door.

MODE FOR INVENTION

Hereinafter, embodiments of the present disclosure will be described in detail with reference to the accompanying drawings. In this specification, the terms "front end," "rear end," "upper portion," "lower portion," "upper end" and "lower end" used in the following description are defined with reference to the drawings, and the shape and position of each component are not limited by these terms.

Home appliances may include various products such as washing machines, dryers, refrigerators, ovens, and microwaves. However, as for the home appliances, it is sufficient to have a main body having an inner space and a door provided to open and close the inner space, and the type of the home appliances is not limited to the above example. Hereinafter, a dryer will be described as an example of a home appliance.

Figure 1:
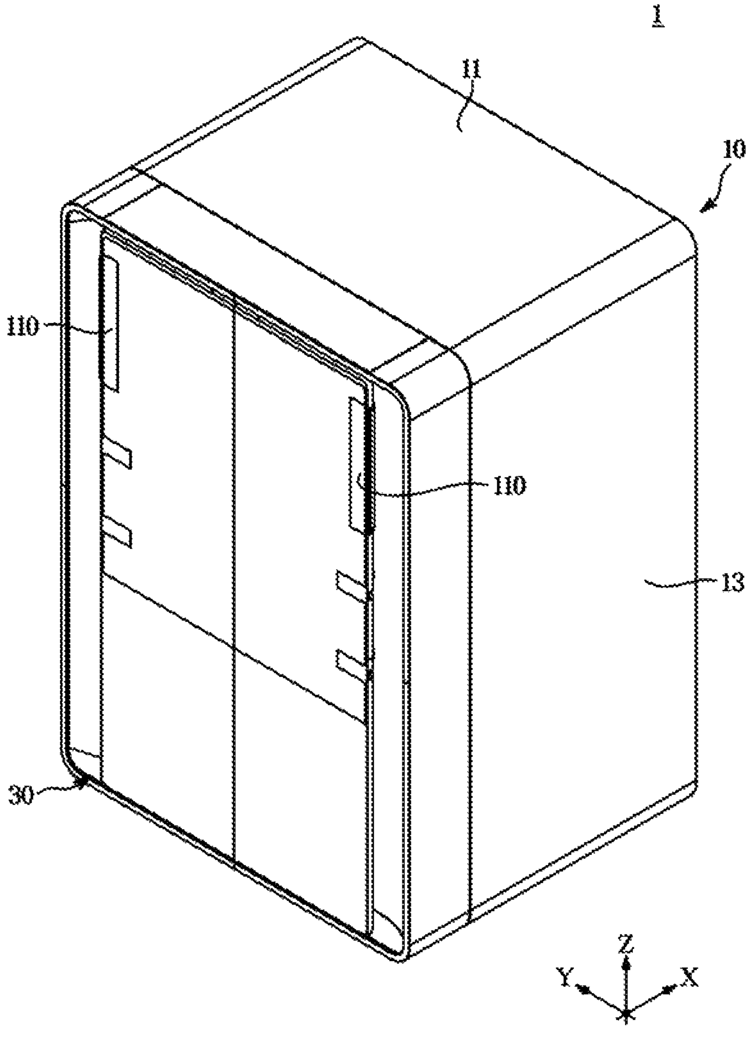
FIG. 1 is a perspective view of a home appliance according to an embodiment of the present disclosure.
Figure 2:
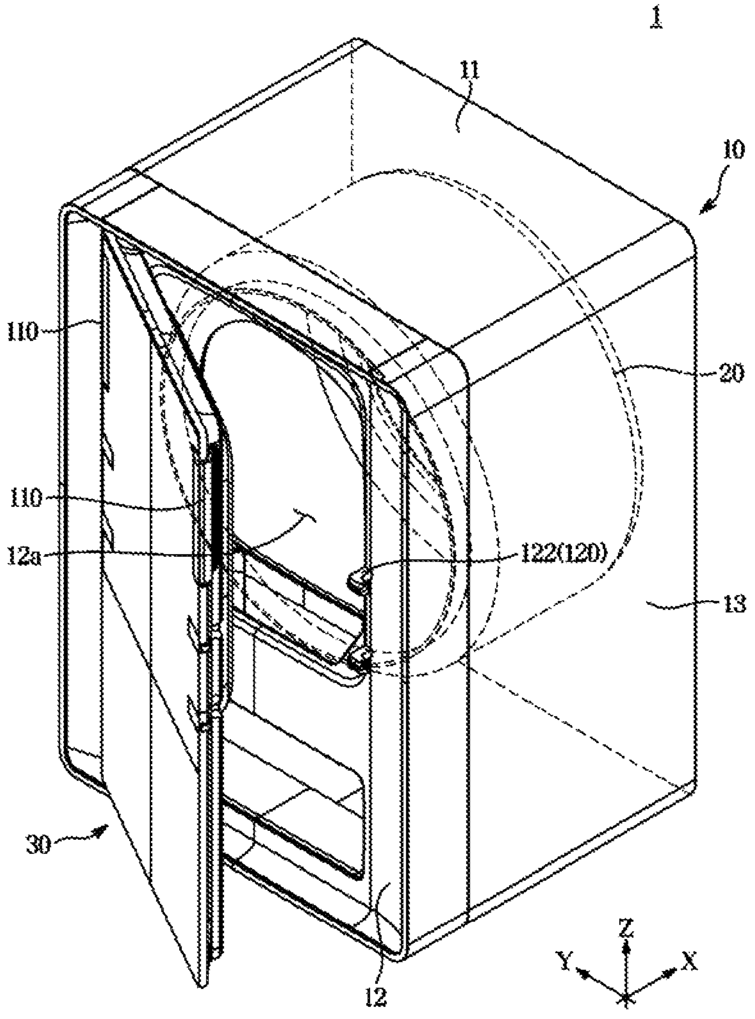
FIG. 2 is a perspective view illustrating a state in which a door of the home appliance according to an embodiment of the present disclosure is opened from the right side.
Figure 3:
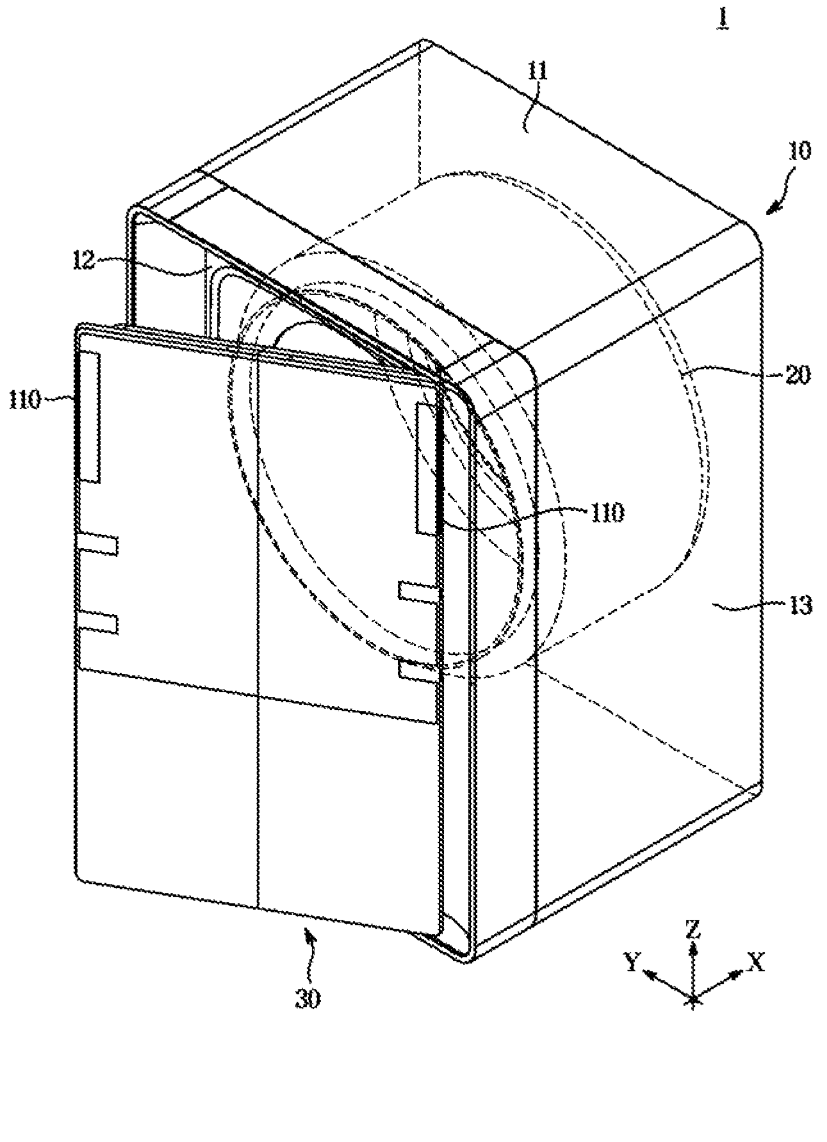
FIG. 3 is a perspective view illustrating a state in which the door of the home appliance according to an embodiment of the present disclosure is opened from the left side.

FIG. 1 is a perspective view of a home appliance according to an embodiment of the present disclosure, and FIG. 2 is a perspective view illustrating a state in which a door of the home appliance according to an embodiment of the present disclosure is opened from the right side. FIG. 3 is a perspective view illustrating a state in which the door of the home appliance according to an embodiment of the present disclosure is opened from the left side. Hereinafter, "X" indicates to a front-rear direction of a dryer 1, "Y" indicates a left-right direction of the dryer 1, and "Z" indicates an up-down direction of the dryer 1.

As illustrated in FIGS. 1 to 3, the dryer 1 may include a main body 10 forming an appearance thereof.

The main body 10 may have a substantially box shape. Specifically, the main body 10 may include an upper panel 11, a bottom panel (not shown), a front panel 12, a left panel (not shown), a right panel 13, and a rear panel (not shown).

An opening 12*a* may be formed on the front panel 12 of the main body 10 to put an object to be dried into a drum 20 or to draw out the object to be dried from the inside of the drum 20.

The main body 10 may further include an inner space. The inner space may be defined by the upper panel 11, the bottom panel, the front panel 12, the left panel, the right panel 13, and the rear panel, and the drum 20, which will be described later, may be disposed in the inner space.

The dryer 1 may further include the drum 20 provided inside the main body 10 to accommodate an object to be dried. The drum 20 may be provided inside the main body 10 to be rotatable about a rotating axis. A lifter (not shown) may be formed on an inner circumferential surface of the drum 20 to lift the object to be dried when the drum 20 rotates. As the drum 20 rotates, an operation in which the object to be dried is raised by the lifter and then drop may be repeated.

The dryer 1 may further include a door 30 provided to open and close the inner space of the main body 10. In other words, the dryer 1 may further include the door 30 provided to open and close the opening 12*a*. The door 30 may be rotatably installed on the right or left side of the main body 10 to open and close the inner space. Specifically, the door 30 may be rotatably installed on the right or left side of the front panel 12 of the main body 10 to open and close the opening 12*a*. Because a user may change an opening/closing direction of the door 30 without completely separating the door 30 from the main body 10, various safety accidents that may occur in a process of changing the installation location of the door 30 by completely separating the door 30 from the main body 10 may be prevented in advance. A detailed description of a method of changing the opening/closing direction of the door 30 will be described later.

The dryer 1 may further include a driving unit (not shown) provided to rotate the drum 20. The driving unit may include a driving motor installed at an inner lower portion of the main body 10, a pulley and a belt for transmitting power of the driving motor to the drum 20.

The dryer 1 may further include a hot air supply unit (not shown) for supplying hot air into the drum 20. The hot air supply unit may include a heater provided to heat the sucked air.

Figure 4:
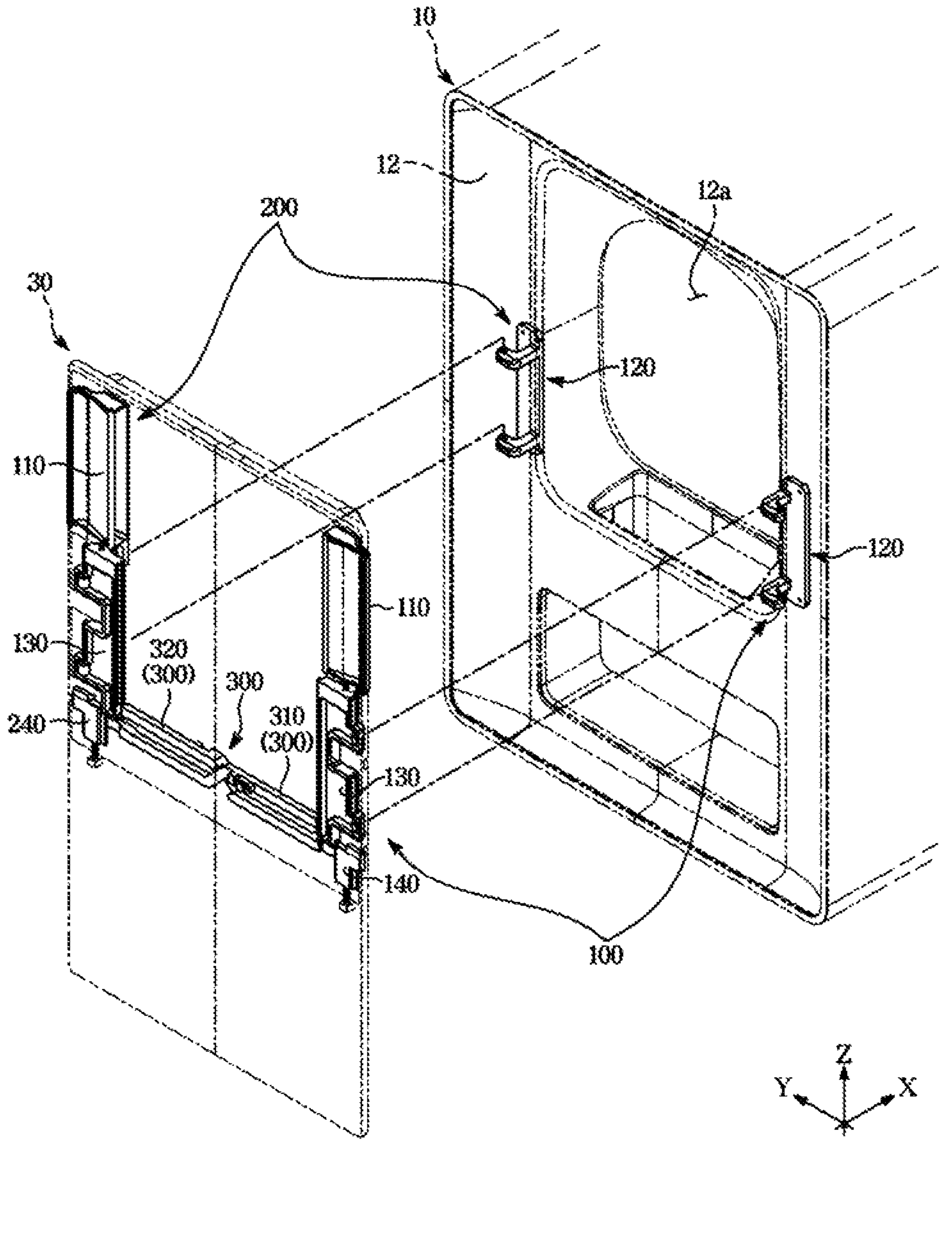
FIG. 4 is a view illustrating a state in which the door and a main body are separated in the home appliance according to an embodiment of the present disclosure.

FIG. 4 is a view illustrating a state in which the door and the main body are separated in the home appliance according to an embodiment of the present disclosure.

As illustrated in FIG. 4, the dryer 1 may include a first door opening/closing system 100 provided on the right sides of the main body 10 and the door 30 to be involved in a right opening of the door 30, and a second door opening/closing system 200 provided on the left sides of the main body 10 and the door 30 to be involved in a left opening of the door 30. The first door opening/closing system 100 and the second door opening/closing system 200 may be in a symmetrical relationship with each other.

The dryer 1 may further include a locking member 300 disposed between the first door opening/closing system 100 and the second door opening/closing system 200 to prevent the right and left sides of the door 30 from being opened at the same time, that is, to prevent the door 30 from being completely separated from the main body 10 when the opening/closing direction of the door 30 is changed. Specifically, the locking member 300 may be disposed between the first door opening/closing system 100 and the second door opening/closing system 200 to prevent the left opening of the door 30 when the first door opening/closing system 100 is operated and to prevent the right opening of the door 30 when the second door opening/closing system 200 is operated. The locking member 300 may be disposed between the first door opening/closing system 100 and the second door opening/closing system 200 to be slidable in a left-right direction Y of the dryer 1.

As illustrated in FIGS. 2 and 4, a fixing bracket 120 of the first door opening/closing system 100 and the fixing bracket 120 of the second door opening/closing system 200 may be installed on the front panel 12 of the main body 10 such that portions of the fixing brackets 120 are exposed to the outside of the main body 10.

As illustrated in FIG. 4, the remaining components of the first door opening/closing system 100 and the second door opening/closing system 200 may be installed on the door 30. A handle 110 of the first door opening/closing system 100 and the handle 110 of the second door opening/closing system 200 may be installed on the door 30 such that portions of the handles 110 are exposed to the outside of the door 30. This is a result of considering the user's ease of access to the handles 110.

Figure 5:
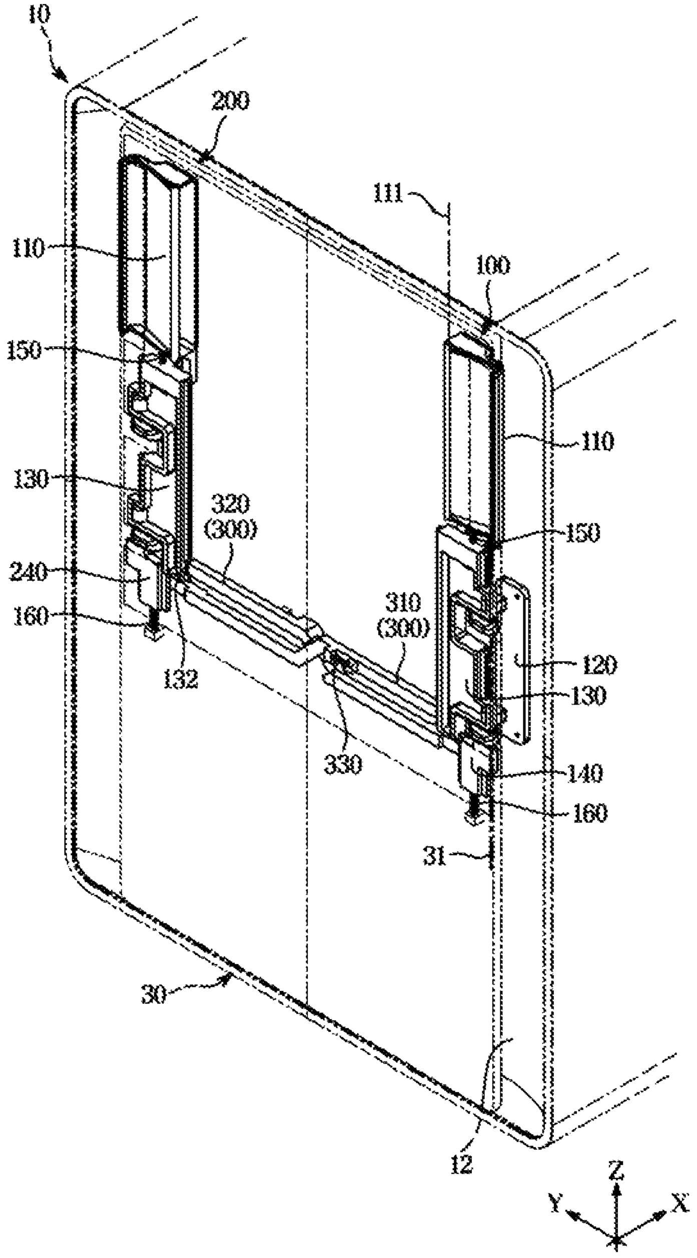
FIG. 5 is a view illustrating a door opening/closing system in a state in which the door is closed in the home appliance according to an embodiment of the present disclosure.
Figure 6:
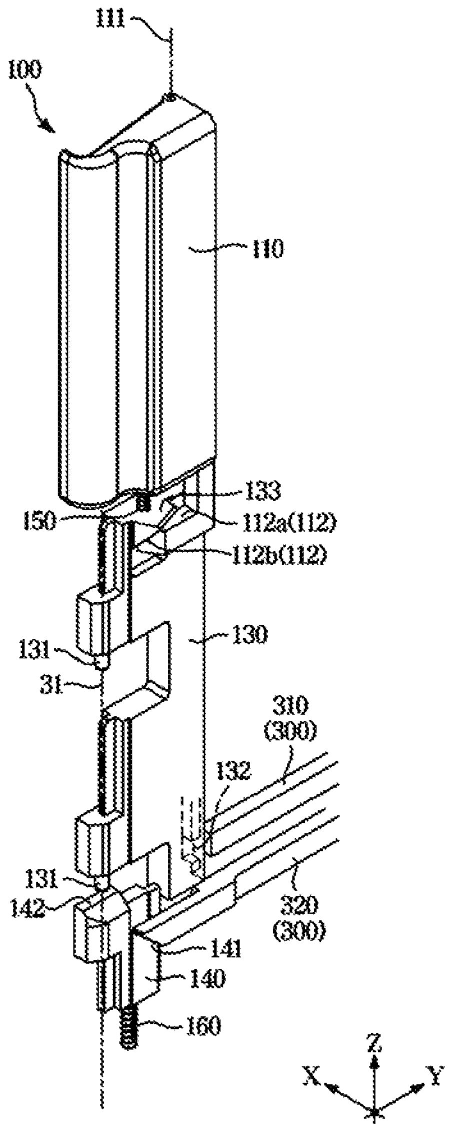
FIG. 6 is a view illustrating the door opening/closing system of FIG. 5 which is viewed from the rear.

FIG. 5 is a view illustrating a door opening/closing system in a state in which the door is closed in the home appliance according to an embodiment of the present disclosure, and FIG. 6 is a view illustrating the door opening/closing system of FIG. 5 which is viewed from the rear. For reference, FIG.

6 is a view illustrating the first door opening/closing system 100 which is viewed from the rear. For reference, the fixing bracket 120 of the first door opening/closing system 100 is omitted in FIG. 6.

As illustrated in FIGS. 5 and 6, the dryer 1 may include the door opening/closing system. The door opening/closing system may include the first door opening/closing system 100 involved in the right opening of the door 30, and the second door opening/closing system 200 involved in the left opening of the door 30.

The first door opening/closing system 100 may include the handle 110 rotatably installed on the right side of the door 30. The handle 110 may be installed on the right side of the door 30 to be rotatable about a handle rotating axis 111 extending in an up-down direction Z of the dryer 1.

The second door opening/closing system 200 may include the handle 110 rotatably installed on the left side of the door 30. The handle 110 may be installed on the left side of the door 30 to be rotatable about the handle rotating axis 111 extending in the up-down direction Z of the dryer 1.

The first door opening/closing system 100 may further include the fixing bracket 120 installed on the right side of the main body 10. Specifically, the fixing bracket 120 may be installed on the front panel 12 of the main body 10. The fixing bracket 120 may include a bracket body 121 fixedly installed on the front panel 12 of the main body 10, and an arm 122 extending from the bracket body 121 toward the front of the dryer 1 to be exposed to the outside of the main body 10 and having a coupling hole 123. An inclined surface 124 may be formed on the arm 122 of the fixing bracket 120 so that a protrusion 131 of a moving member 130 is easily coupled to the coupling hole 123 or easily separated from the coupling hole 123.

The second door opening/closing system 200 may further include the fixing bracket 120 installed on the left side of the main body 10. Specifically, the fixing bracket 120 may be installed on the front panel 12 of the main body 10. A description of a structure of the fixing bracket 120 of the second door opening/closing system 200 is the same as the description of the structure of fixing bracket 120 of the first door opening/closing system 100 and thus will be omitted.

The first door opening/closing system 100 may further include the moving member 130 moving in the up-down direction Z of the dryer 1 by being interlocked with the handle 110 to be selectively coupled to the fixing bracket 120. The moving member 130 may include the protrusion 131 provided to be selectively coupled to the coupling hole 123. The protrusion 131 of the moving member 130 may be coupled to the coupling hole 123 of the fixing bracket 120 to form a rotating axis 31 of the door 30. The rotating axis 31 of the door 30 may extend in the up-down direction Z of the dryer 1 and may be parallel to the handle rotating axis 111. The rotating axis 31 of the door 30 may be located farther from the outside of the door 30 than the handle rotating axis 111. The moving member 130 may further include a coupling groove 132 provided such that a first locking member 310 may be inserted therein and coupled thereto. The coupling groove 132 of the moving member 130 may be formed by being recessed from one side of the moving member 130 facing the second door opening/closing system 200.

The second door opening/closing system 200 may further include the moving member 130 moving in the up-down direction Z of the dryer 1 by being interlocked with the handle 110 to be selectively coupled to the fixing bracket 120. Like the moving member 130 of the first door opening/closing system 100, the moving member 130 may include the protrusion 131 and the coupling groove 132. The coupling groove 132 of the second door opening/closing system 200 may be formed by being recessed from one side of the moving member 130 facing the first door opening/closing system 100 such that a second locking member 320 may be inserted therein and coupled thereto. Except for the above, a description of the moving member 130 of the second door opening/closing system 200 is the same as the description of the moving member 130 of the first door opening/closing system 100 and thus will be omitted.

The locking member 300 may include the first locking member 310 to prevent the right opening of the door 30 and the second locking member 320 to prevent the left opening of the door 30. The first locking member 310 and the second locking member 320 may independently move by being disposed to cross each other. Specifically, the first locking member 310 and the second locking member 320 may independently move in the left-right direction Y of the dryer 1 by being disposed to cross each other.

One end of the first locking member 310 may be provided to be movable along a guide surface 141 formed on a second locking guide member 240, and the other end of the first locking member 310 may be provided to be selectively coupled to the moving member 130 of the first door opening/closing system 100.

One end of the second locking member 320 may be provided to be movable along the guide surface 141 formed on a first locking inducing member 140, and the other end of the second locking member 320 may be provided to be selectively coupled to the moving member 130 of the second door opening/closing system 200.

The first door opening/closing system 100 may further include the first locking inducing member 140 provided to move the second locking member 320 toward the second door opening/closing system 200 by integrally rotating with the door 30 when the right side of the door 30 is opened. One end of the second locking member 320 pressed toward the second door opening/closing system 200 by the first locking inducing member 140 may be coupled to the coupling groove 132 of the moving member 130 of the second door opening/closing system 200. Accordingly, the movement of the moving member 130 of the second door opening/closing system 200 in the up-down direction Z of the dryer 1 is limited. Therefore, even when the user presses the handle 110 of the second door opening/closing system 200, the protrusion 131 of the moving member 130 of the second door opening/closing system 200 is maintained in a state of being coupled to the coupling hole 123 of the fixing bracket 120 of the second door opening/closing system 200, so that the left opening of the door 30 is limited.

The first locking inducing member 140 may include a guide surface 141 provided to guide the movement of the second locking member 320, and a contact surface 142 provided to be inclined such that the first locking inducing member 140 comes into contact with and is guided by the arm 122 of the fixing bracket 120. Specifically, the contact surface 142 of the first locking inducing member 140 may be provided to be inclined to come into contact with and be guided by the arm 122 of the fixing bracket 120 of the first door opening/closing system 100 when the right side of the door 30 is opened or closed. The guide surface 141 of the first locking inducing member 140 may be formed on a rear surface of the first locking inducing member 140.

The second door opening/closing system 200 may further include the second locking inducing member 240 provided to move the first locking member 310 toward the first door opening/closing system 100 by integrally rotating with the door 30 when the left side of the door 30 is opened. One end of the first locking member 310 pressed toward the first door opening/closing system 100 by the second locking inducing member 240 may be coupled to the coupling groove 132 of the moving member 130 of the first door opening/closing system 100. Accordingly, the movement of the moving member 130 of the first door opening/closing system 100 in the up-down direction Z of the dryer 1 is limited. Therefore, even when the user presses the handle 110 of the first door opening/closing system 100, the protrusion 131 of the moving member 130 of the first door opening/closing system 100 is maintained in a state of being coupled to the coupling hole 123 of the fixing bracket 120 of the first door opening/closing system 100, so that the right opening of the door 30 is limited.

The second locking inducing member 240 may include the guide surface 141 provided to guide the movement of the first locking member 310, and the contact surface 142 provided to be inclined such that the second locking inducing member 240 comes into contact with and is guided by the arm 122 of the fixing bracket 120. Specifically, the contact surface 142 of the second locking inducing member 240 may be provided to be inclined to come into contact with and be guided by the arm 122 of the fixing bracket 120 of the second door opening/closing system 200 when the left side of the door 30 is opened or closed. The guide surface 141 of the second locking inducing member 240 may be formed on a rear surface of the second locking inducing member 240.

The first door opening/closing system 100 may further include an elastic member 150 disposed between the handle 110 and the moving member 130 to be elastically deformable according to the movement of the moving member 130. The elastic member 150 may include a spring.

The second door opening/closing system 200 may also further include the elastic member 150. A description of the elastic member 150 of the second door opening/closing system 200 is the same as the description of the elastic member 150 of the first door opening/closing system 100 and thus will be omitted.

The first door opening/closing system 100 may further include an elastic body 160 coupled to internal structures of the first locking inducing member 140 and the door 30 to be elastically deformable according to the movement of the first locking inducing member 140. The elastic body 160 may include a spring.

The second door opening/closing system 200 may further include the elastic body 160 coupled to internal structures of the second locking inducing member 240 and the door 30 to be elastically deformable according to the movement of the second locking inducing member 240. The elastic body 160 may include a spring.

On the first locking member 310, an elastic unit 330 provided to be elastically deformable according to the movement of the first locking member 310 may be installed. One end of the elastic unit 330 may be coupled to the first locking member 310, and the other end of the elastic unit 330 may be coupled to the internal structure of the door 30. The elastic unit 330 may include a spring.

On the second locking member 320, the elastic unit 330 provided to be elastically deformable according to the movement of the second locking member 320 may be installed. A description of the elastic unit 330 installed on the second locking member 320 is the same as the description of the elastic unit 330 installed on the first locking member 310 and thus will be omitted.

As illustrated in FIG. 6, the handle 110 of the first door opening/closing system 100 may include a coupling part 112 provided to interfere with a protrusion 133 of the moving member 130 of the first door opening/closing system 100. The coupling part 112 may include a first section **112*a* and a second section 112*b* extending from the first section 112*a* to be inclined downward. When the right side of the door 30 is closed, the protrusion 133 of the moving member 130 may be located in the second section 112*b* of the coupling part 112 of the handle 110. On the other hand, when the right side of the door 30 is opened, the protrusion 133 of the moving member 130 may be located in the first section 112*a* by moving along the second section 112*b* of the coupling part 112 of the handle 110**.

The handle 110 of the second door opening/closing system 200 may also include a coupling part (not shown) provided to interfere with a protrusion (not shown) of the moving member 130 of the second door opening/closing system 200. A description of the coupling part of the second door opening/closing system 200 is the same as the description of the coupling part of the first door opening/closing system 100 and thus will be omitted.

Hereinafter, operation processes of the door opening/closing systems will be described. For convenience of explanation, a description will focus on processes of opening and closing the right side of the door 30.

Figure 7:
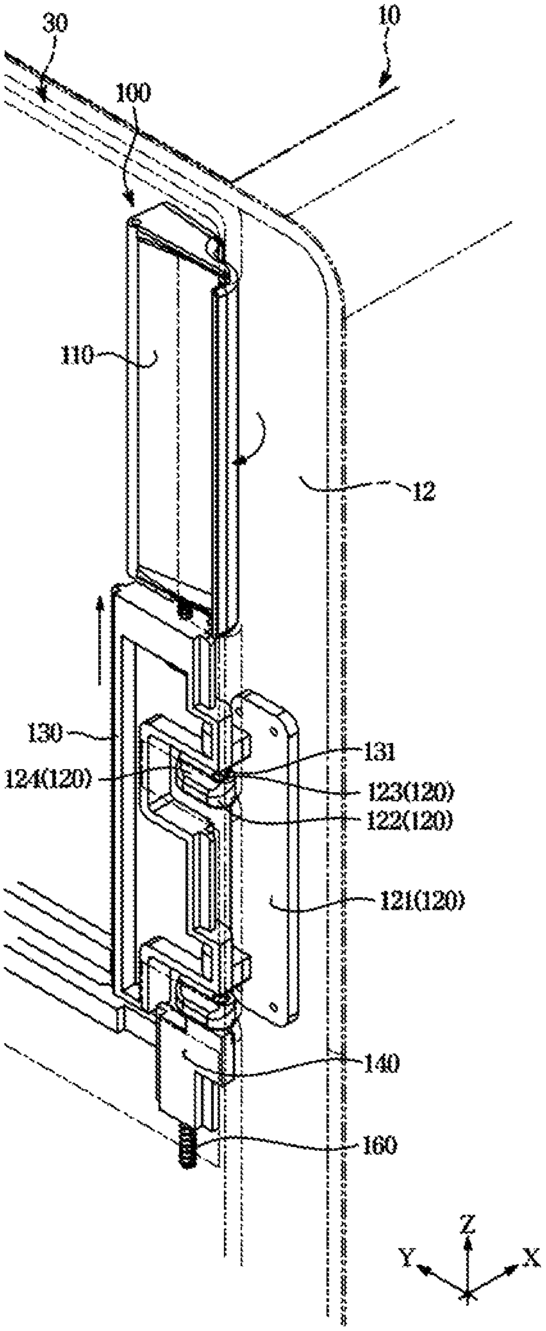
FIG. 7 is a view illustrating the door opening/closing system when a door lever is pulled in the home appliance according to an embodiment of the present disclosure.
Figure 8:
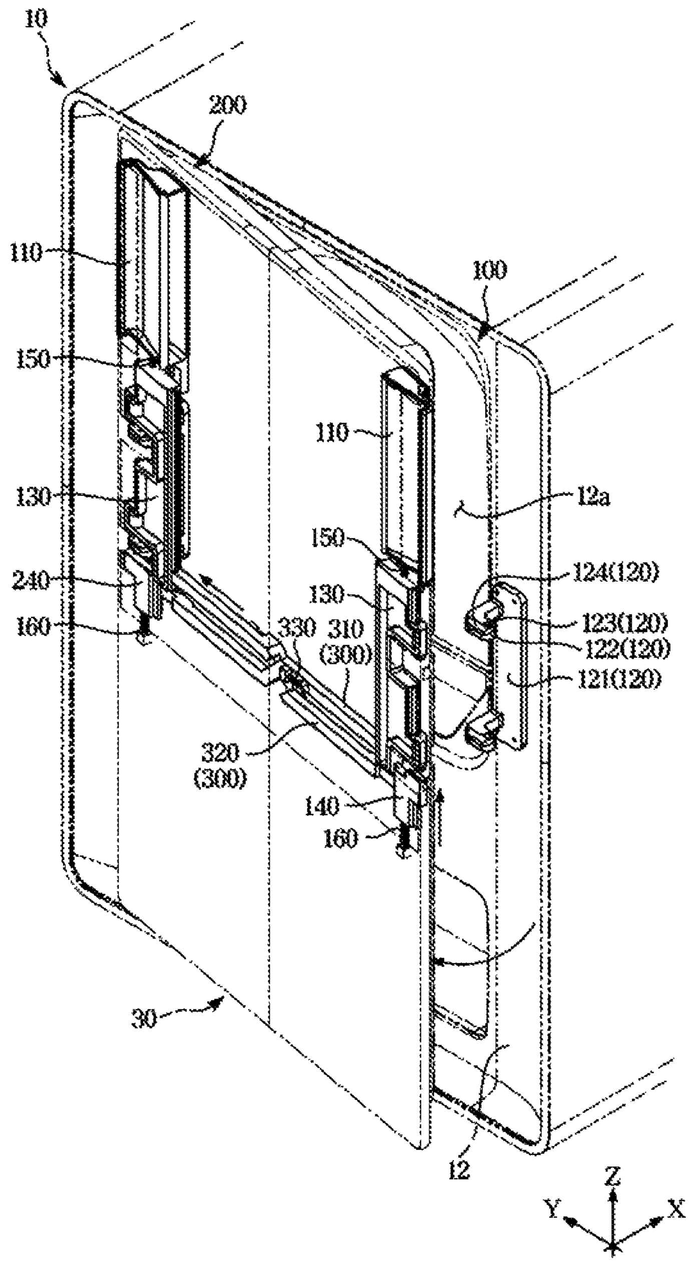
FIG. 8 is a view illustrating the door opening/closing system when the door is opened from the right side in the home appliance according to an embodiment of the present disclosure.
Figure 9:
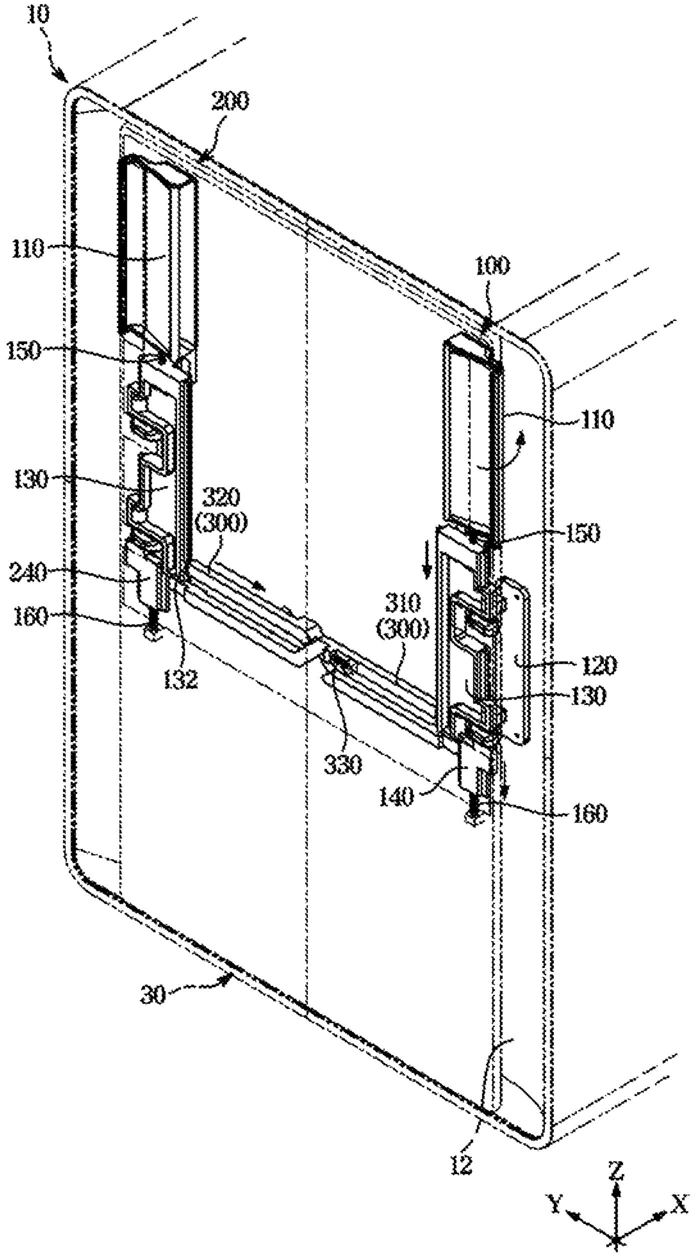
FIG. 9 is a view illustrating the door opening/closing system when a door opened from the right side is closed in the home appliance according to an embodiment of the present disclosure.

FIG. 7 is a view illustrating the door opening/closing system when a door lever is pulled in the home appliance according to an embodiment of the present disclosure, and FIG. 8 is a view illustrating the door opening/closing system when the door is opened from the right side in the home appliance according to an embodiment of the present disclosure. FIG. 9 is a view illustrating the door opening/closing system when a door opened from the right side is closed in the home appliance according to an embodiment of the present disclosure.

As illustrated in FIG. 7, when the user rotates the handle 110 of the first door opening/closing system 100 toward the front, as the protrusion 133 of the moving member 130 of the first door opening/closing system 100 moves along the second section **112*b* of the coupling part 112 of the handle 110, the moving member 130 may move an upward direction of the dryer 1. At this time, the protrusion 133 of the moving member 130 may be located in the first section 112*a* of the coupling part 112 of the handle 110. When the moving member 130 of the first door opening/closing system 100 moves in the upward direction of the dryer 1, the protrusion 131 of the moving member 130 is separated from the coupling hole 123 of the fixing bracket 120 of the first door opening/closing system 100 so that the right side of the door 30** is openable.

As illustrated in FIG. 8, when the right side of the door 30 is opened, the first locking inducing member 140 is spaced apart from the arm 122 of the fixing bracket 120 of the first door opening/closing system 100 and moves in the upward direction of the dryer 1 by an elastic restoring force of the elastic body 160. When the first locking inducing member 140 moves in the upward direction of the dryer 1, the second locking member 320 moves toward the second door opening/closing system 200 by being guided by the guide surface 141 of the first locking inducing member 140 and interferes with the moving member 130 of the second door opening/closing system 200. Accordingly, the left opening of the door 30 is limited.

As illustrated in FIG. 9, when the right side of the door 30 is closed, the handle 110 of the first door opening/closing system 100 rotates to its original state, and the moving member 130 of the first door opening/closing system 100 moves in a downward direction of the dryer 1. At this time, the protrusion 131 of the moving member 130 may be fixedly coupled to the coupling hole 123 of the fixing bracket 120 of the first door opening/closing system 100. Also, the contact surface 142 of the first locking inducing member 140 may be in close contact with the arm 122 of the fixing bracket 120. At this time, the second locking member 320 moves toward the first door opening/closing system 100 by being separated from the moving member 130 of the second door opening/closing system 200 by the elastic restoring force of the elastic unit 330.

Figure 10:
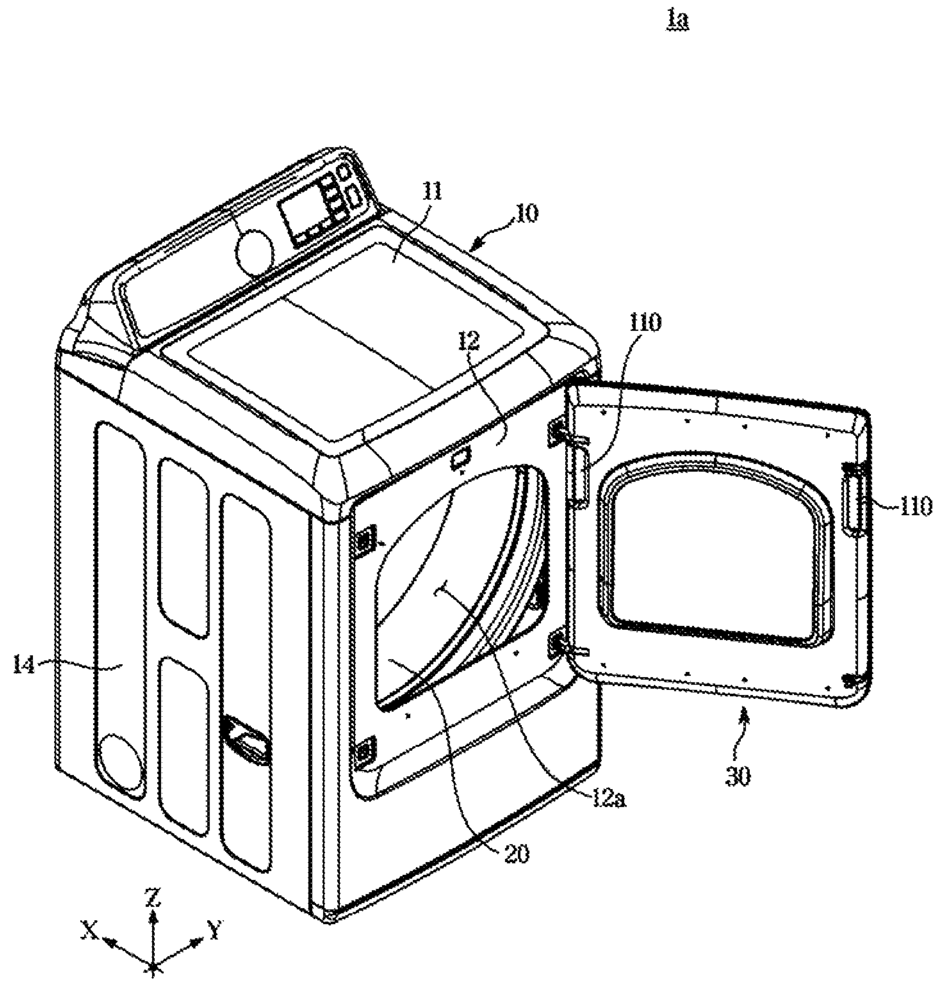
FIG. 10 is a perspective view of a home appliance according to another embodiment of the present disclosure.
Figure 11:
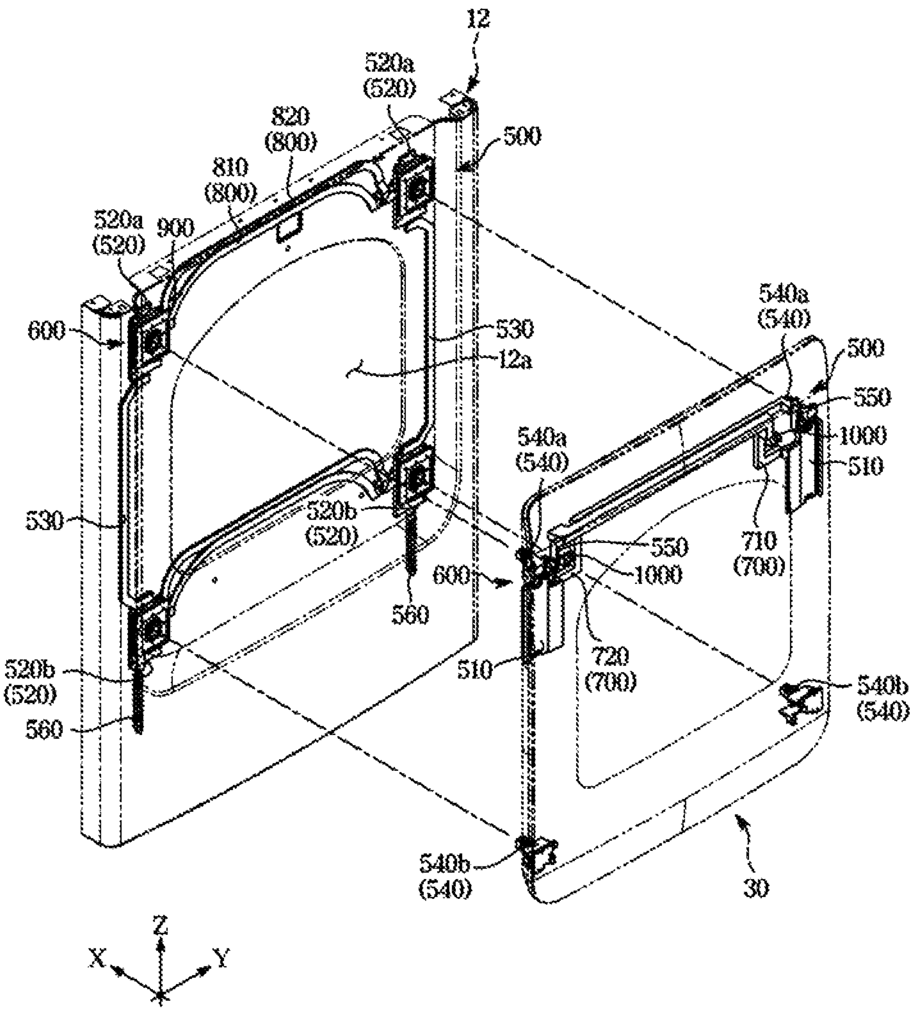
FIG. 11 is a view illustrating a state in which a door and a main body are separated in the home appliance according to another embodiment of the present disclosure.

FIG. 10 is a perspective view of a home appliance according to another embodiment of the present disclosure, and FIG. 11 is a view illustrating a state in which a door and a main body are separated in the home appliance according to another embodiment of the present disclosure. Hereinafter, contents overlapping with those described with reference to FIGS. 1 to 3 will be omitted. For reference, reference numeral "14" in FIG. 10 denotes the left panel.

As illustrated in FIGS. 10 and 11, a dryer 1*a* may include the door 30 provided to open and close the inner space of the main body 10. In other words, the dryer 1*a* may include the door 30 provided to open and close the opening 12*a*. The door 30 may be rotatably installed on the right side or the left side of the main body 10 to open and close the inner space. Specifically, the door 30 may be rotatably installed on the right or left side of the front panel 12 of the main body 10 to open and close the opening 12*a*.

The dryer 1*a* may include a door opening/closing system. The door opening/closing system a first door opening/closing system 500 provided on the right sides of the main body 10 and the door 30 to be involved in a right opening of the door 30, and a second door opening/closing system 600 provided on the left sides of the main body 10 and the door 30 to be involved in a left opening of the door 30. The first door opening/closing system 500 and the second door opening/closing system 600 may be in a symmetrical relationship with each other.

The dryer 1*a* may further include a locking member 700 disposed on the door 30 to be slidable in the left-right direction Y of the dryer 1*a* between the first door opening/closing system 500 and the second door opening/closing system 600.

The dryer 1*a* may further include an additional locking member 800 disposed on the main body 10 to be slidable in a direction opposite to the locking member 700 to prevent the left opening of the door 30 together with the locking member 700 when the first door opening/closing system 500 is operated and to prevent the right opening of the door 30 together with the locking member 700 when the second door opening/closing system 600 is operated.

As illustrated in FIG. 11, catch members 520 and link members 530 of the first door opening/closing system 500 and the second door opening/closing system 600 may be installed on the front panel 12 of the main body 10. The additional locking member 800 may also be installed on the front panel 12 of the main body 10.

Handles 510, rotation members 550, and lever units 540 of the first door opening/closing system 500 and the second door opening/closing system 600 may be installed on the door 30. The locking member 700 may also be installed on the door 30. The handle 510 of the first door opening/closing system 500 and the handle 510 of the second door opening/closing system 600 may be installed on the door 30 such that portions of the handles 510 are exposed to the outside of the door 30. This is a result of considering the user's ease of access to the handles 510.

Figure 12:
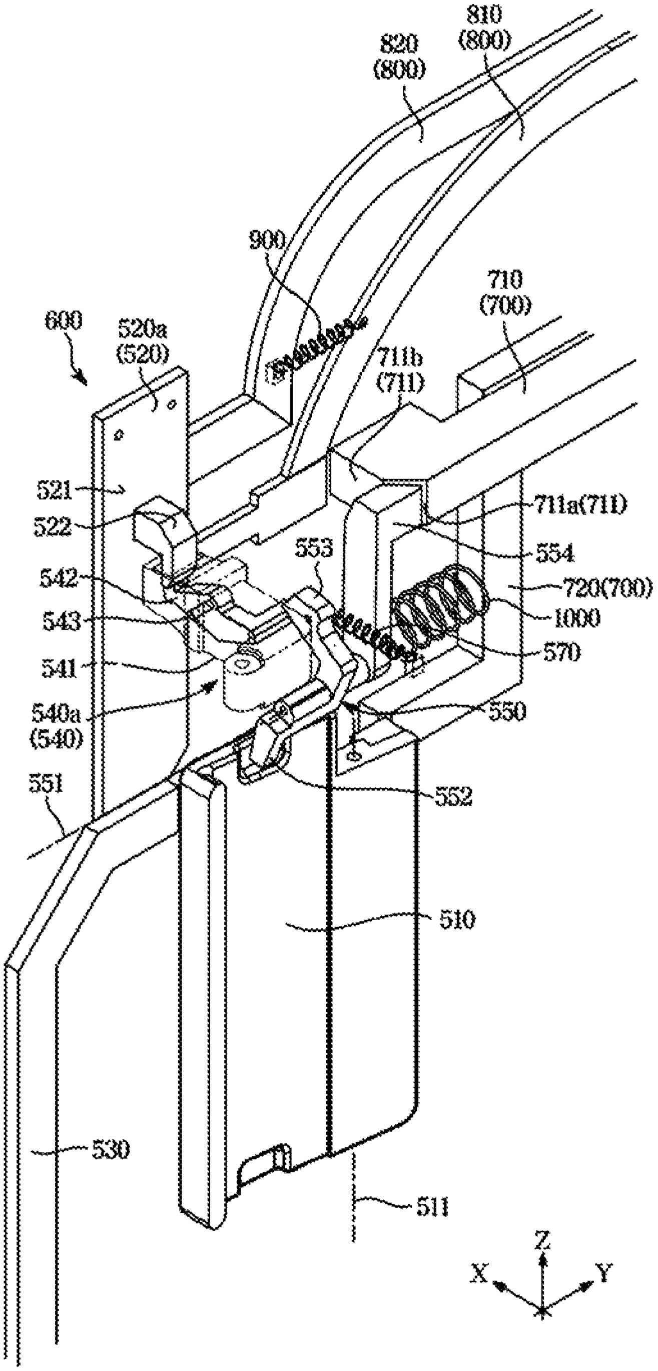
FIGS. 12 to 16 are views illustrating operation processes of a door opening/closing system of the home appliance according to another embodiment of the present disclosure.
Figure 13:
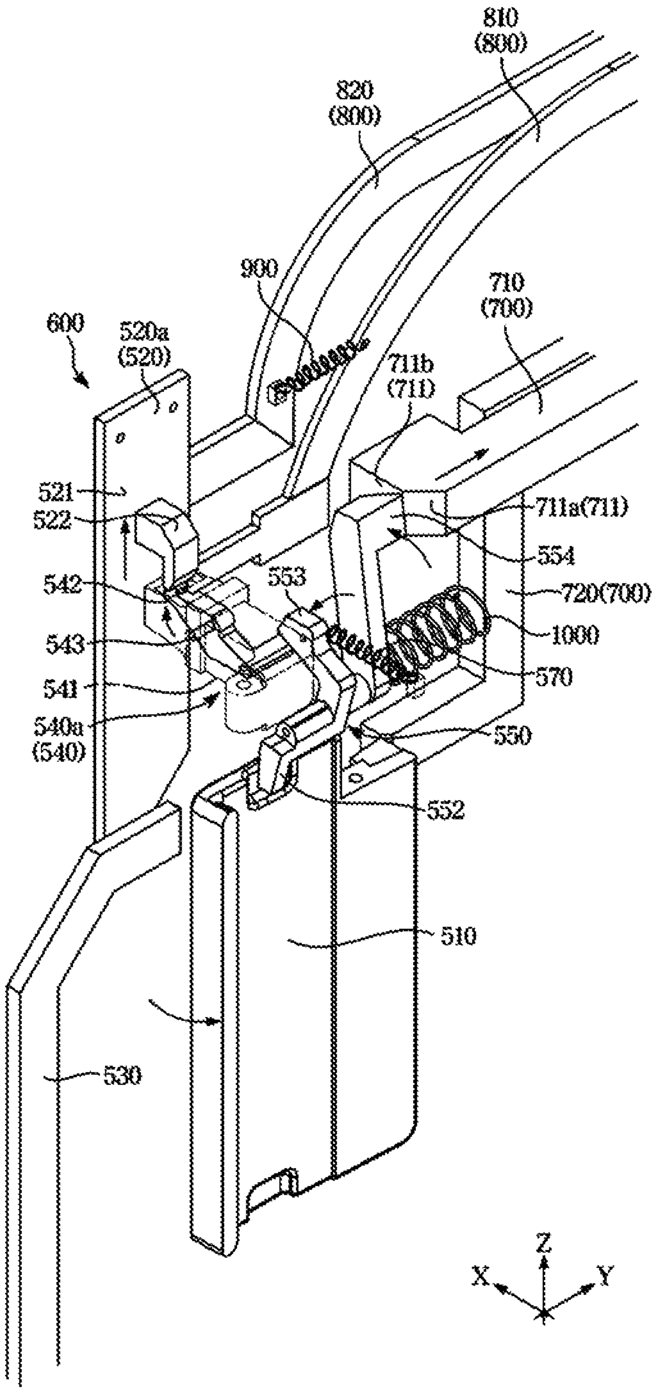
Figure 14:
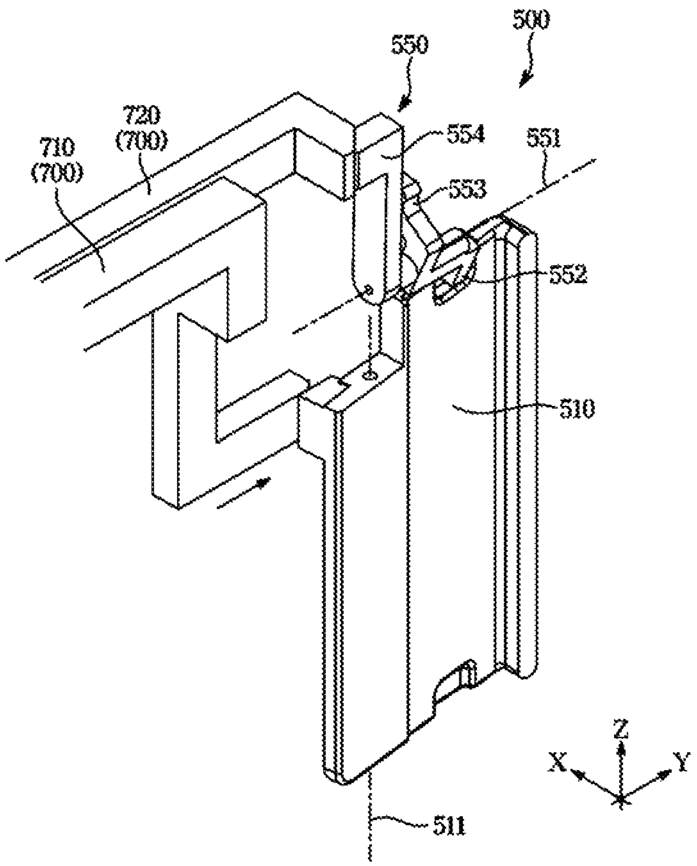
Figure 15:
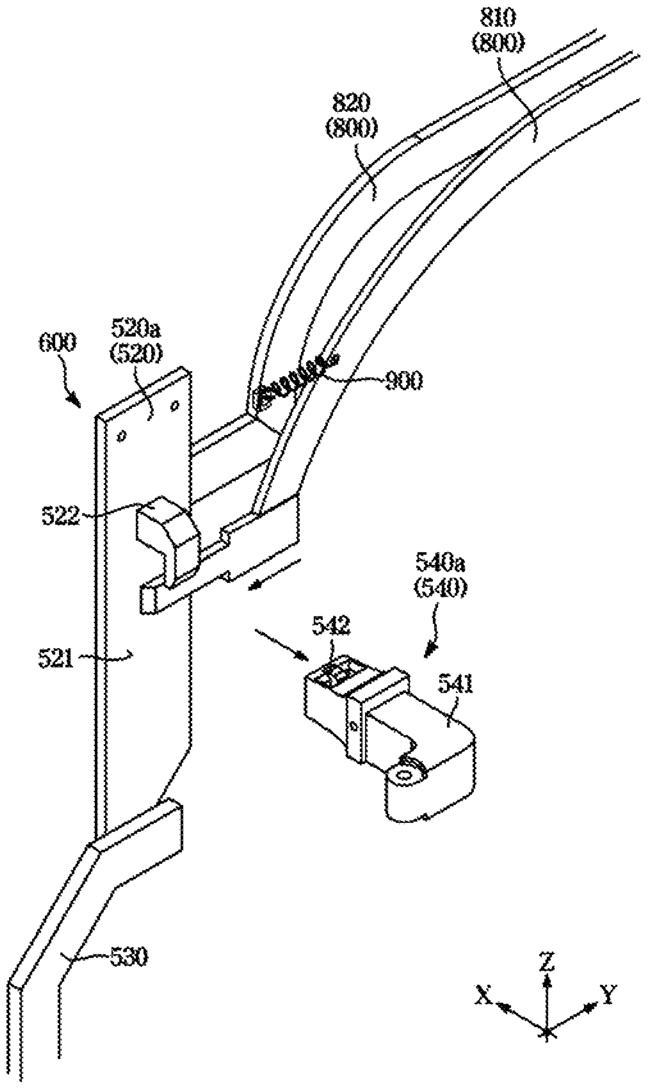
Figure 16:
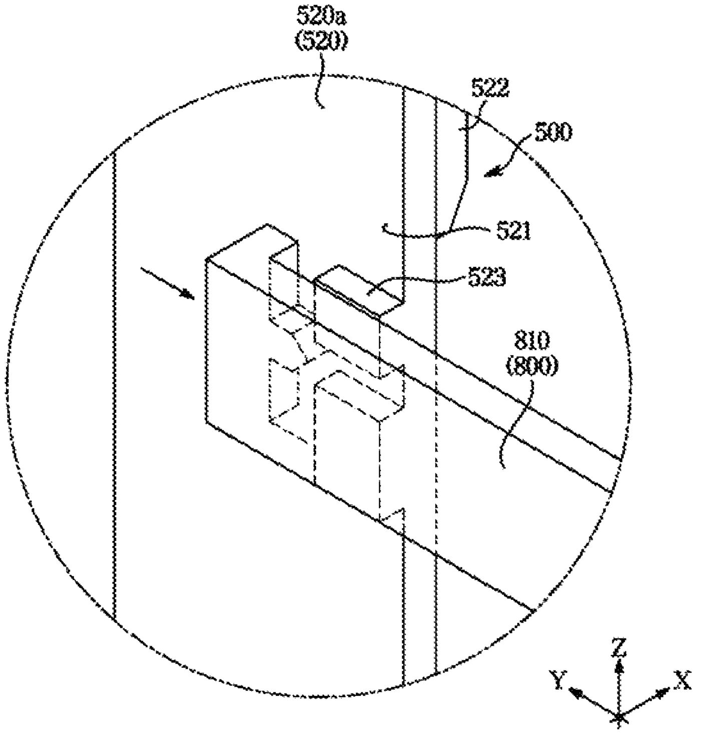

FIGS. 12 to 16 are views illustrating operation processes of a door opening/closing system of the home appliance according to another embodiment of the present disclosure. For convenience of explanation, a description will focus on a process of opening the left side of the door 30. For reference, FIG. 12 illustrates before the left side of the door 30 is opened, that is, when the left side of the door 30 is closed. Hereinafter, in some drawings, some configurations are omitted such that the operation processes of the door opening/closing systems may be clearly seen.

As illustrated in FIGS. 11 and 12, the first door opening/closing system 500 may include the handle 510 rotatably installed on the right side of the door 30. The handle 510 may be installed on the right side of the door 30 to be rotatable about a handle rotating axis (not shown) extending in the up-down direction Z of the dryer 1*a*.

The second door opening/closing system 600 may include the handle 510 rotatably installed on the left side of the door 30. The handle 510 may be installed on the left side of the door 30 to be rotatable about a handle rotating axis 511 extending in the up-down direction Z of the dryer 1*a*.

The first door opening/closing system 500 may further include the catch member 520 installed on the right side of the main body 10 to move in the up-down direction Z of the dryer 1*a*. The catch member 520 may include an upper catch member 520*a* installed at an upper portion of the main body 10 and a lower catch member 520*b* installed at a lower portion of the main body 10. The upper catch member 520*a* and the lower catch member 520*b* may be connected by the link member 530 to integrally move in the up-down direction Z of the dryer 1*a*. For a description of a structure of the catch member 520, reference will be made to a description of the catch member 520 of the second door opening/closing system 600, which will be described later.

The second door opening/closing system 600 may further include the catch member 520 installed on the left side of the main body 10 to move in the up-down direction Z of the dryer 1*a*. The catch member 520 may include the upper catch member 520*a* installed at the upper portion of the main body 10 and the lower catch member 520*b* installed at the lower portion of the main body 10. The upper catch member 520*a* and the lower catch member 520*b* may be connected by the link member 530 to integrally move in the up-down direction Z of the dryer 1*a*. The catch member 520 may include a catch member body 521, and a pressing protrusion 522 extending from the catch member body 521 toward the front of the dryer 1*a* to be bent toward the downward direction of the dryer 1*a*. The pressing protrusion 522 of the catch member 520 may interact with a lever 542. The catch member 520 may further include a locking part 523. The locking part 523 may be formed on a surface opposite to one surface of the catch member body 521 on which the pressing protrusion 522 is formed to interact with a second additional locking member 820.

Each of the first door opening/closing system 500 and the second door opening/closing system 600 may further include the link member 530 to connect the upper catch member 520*a* and the lower catch member 520*b*.

The first door opening/closing system 500 may further include the lever unit 540 provided on the door 30 to selectively interfere with the catch member 520. For a description of a structure of the lever unit 540, reference will be made to a description of the lever unit 540 of the second door opening/closing system 600, which will be described later.

The second door opening/closing system 600 may further include the lever unit 540 provided on the door 30 to selectively interfere with the catch member 520. The lever unit 540 may be provided on the door 30 to be rotatable at a predetermined angle. The lever unit 540 may include an upper lever unit 540*a* provided at an upper portion of the door 30 and a lower lever unit 540*b* provided at a lower portion of the door 30. The lever unit 540 may include a lever casing 541, and the lever 542 disposed rotatably inside the lever casing 541 such that a portion thereof is located outside the lever casing 541. The lever 542 may be disposed to be rotatable about a lever axis 543 extending in the left-right direction Y of the dryer 1*a*. The lever 542 may have a first end positioned outside the lever casing 541 and in the front of the lever axis 543, and a second end positioned inside the lever casing 541 and in the rear of the lever axis 543. The first end of the lever 542 may interact with a pressing part 553 of the rotation member 550, and the second end of the lever 542 may interact with the pressing protrusion 522 of the catch member 520. The lever unit 540 and the catch member 520 may interfere with or be combined with each other to define the rotating axis 31 of the door 30.

The first door opening/closing system 500 may further include the rotation member 550 disposed to be rotatable by being interlocked with the handle 510. For a description of a structure of the rotation member 550, reference will be made to a description of the rotation member 550 of the second door opening/closing system 600, which will be described later.

The second door opening/closing system 600 may further include the rotation member 550 disposed to be rotatable by being interlocked with the handle 510. The rotation member 550 may be disposed to be rotatable about a rotation member axis 551 extending in the left-right direction Y of the dryer 1*a*. The rotation member 550 may include a handle interference part 552 provided to interfere with the handle 510, a pressing part 553 provided to press the lever 542 of the lever unit 540, and a push part 554 provided to press a first locking member 710.

The locking member 700 may include the first locking member 710 to prevent the right opening of the door 30, and a second locking member 720 to prevent the left opening of the door 30. The first locking member 710 and the second locking member 720 may independently move by being disposed to cross each other. Specifically, the first locking member 710 and the second locking member 720 may independently move in the left-right direction Y of the dryer 1*a* by being disposed to cross each other. The first locking member 710 may include a guide surface 711 facing the push part 554 of the rotation member 550 of the second door opening/closing system 600. The guide surface 711 of the first locking member 710 may include a first section 711*a* formed to be inclined and a second section 711*b* extending from the first section 711*a* to be positioned in the rear of the first section 711*a*. When the left side of the door 30 is closed, the push part 554 of the rotation member 550 of the second door opening/closing system 600 may be positioned in the first section 711*a* of the guide surface 711 of the first locking member 710. When the left side of the door 30 is opened, the push part 554 of the rotation member 550 of the second door opening/closing system 600 may be located in the second section 711*b* by moving along the first section 711*a* of the guide surface 711 of the first locking member 710. When one end of the first locking member 710 is pressed by the push part 554 of the rotation member 550 of the second door opening/closing system 600, the first locking member 710 moves toward the first door opening/closing system 500, and the other end of the first locking member 710 interferes with the handle 510 of the first door opening/closing system 500. As a result, the rotation of the handle 510 of the first door opening/closing system 500 is limited. That is, the right opening of the door 30 is limited. Because the second locking member 720 has the same structure as the first locking member 710, a description of the second locking member 720 will be omitted.

The additional locking member 800 may include a first additional locking member 810 to prevent the right opening of the door 30 together with the first locking member 710, and a second additional locking member 820 to prevent the left opening of the door 30 together with the second locking member 720. The first additional locking member 810 and the second additional locking member 820 may independently move by being disposed to cross each other. Specifically, the first additional locking member 810 and the second additional locking member 820 may independently move in the left-right direction Y of the dryer 1*a* by being disposed to cross each other. One end of the first additional locking member 810 may be provided to interact with the locking part 523 of the catch member 520 of the first door opening/closing system 500. When the left side of the door 30 is opened, the pressing protrusion 522 of the catch member 520 of the first door opening/closing system 500 is separated from the lever casing 541 of the lever unit 540 by being pressed in the upward direction of the dryer 1*a* by the lever 542 of the lever unit 540 of the first door opening/closing system 500. One end of the first additional locking member 810 limits the catch member 520 of the first door opening/closing system 500 from moving in the up-down direction Z of the dryer 1*a* by interfering with the locking part 523 of the catch member 520 of the first door opening/closing system 500. As a result, when the left side of the door 30 is opened, the right opening of the door 30 may be limited by interference between the first locking member 710 and the handle 510 of the first door opening/closing system 500 and interference between the first additional locking member 810 and the catch member 520 of the first door opening/closing system 500. Because the second additional locking member 820 has the same structure as the first additional locking member 810, a description of the second additional locking member 820 will be omitted.

The first additional locking member 810 may be connected to an elastic member 900. The elastic member 900 may be elastically deformed according to the movement of the first additional locking member 810 by being coupled to one side of the first additional locking member 810 facing the first door opening/closing system 500. Specifically, one end of the elastic member 900 may be coupled to one side of the first additional locking member 810 facing the catch member 520 of the first door opening/closing system 500, and the other end of the elastic member 900 may be coupled to an internal structure of the front panel 12. The second additional locking member 820 may also be connected to the elastic member 900. A description of the second additional locking member 820 is the same as the description of the first additional locking member 810 and thus will be omitted.

The second locking member 720 may be connected to an elastic unit 1000. The elastic unit 1000 may be elastically deformed according to the movement of the second locking member 720 by being coupled to one side of the second locking member 720 facing the second door opening/closing system 600. Specifically, one end of the elastic unit 1000 may be coupled to one side of the second locking member 720 facing the second door opening/closing system 600, and the other end of the elastic unit 1000 may be coupled to the internal structure of the door 30. The first locking member 710 may also be connected to the elastic unit 1000. The elastic unit 1000 may include a spring. A description of the first locking member 710 is the same as the description of the second locking member 720 and thus will be omitted.

Each of the first door opening/closing system 500 and the second door opening/closing system 600 may further include an elastic body 570 coupled to the internal structures of the rotation member 550 and the door 30 to be elastically deformable according to the rotation of the rotation member 550. The elastic body 570 may include a spring.

The first door opening/closing system 500 may further include an elastic spring 560 provided to be elastically deformable according to the movement of the catch member 520 in the up-down direction Z of the dryer 1*a*. Suitably, the elastic spring 560 may be coupled to the lower catch member 520*b* of the first door opening/closing system 500 and the internal structure of the door 30 to be elastically deformable.

The second door opening/closing system 600 may also further include the elastic spring 560 provided to be elastically deformable according to the movement of the catch member 520 in the up-down direction Z of the dryer 1*a*. A description of the elastic spring 560 of the second door opening/closing system 600 is the same as the description of the elastic spring 560 of the first door opening/closing system 500 and thus will be omitted.

As illustrated in FIGS. 13 to 16, when the user rotates the handle 510 of the second door opening/closing system 600 toward the front, the rotation member 550 of the second door opening/closing system 600 moving by being interlocked with the handle 510 rotates about the rotation member axis 551. When the rotation member 550 rotates, the pressing part 553 of the rotation member 550 presses the first end of the lever 542 of the lever unit 540 downward, and the push part 554 of the rotation member 550 moves the first locking member 710 toward the first door opening/closing system 500. At this time, the push part 554 of the rotation member 550 may be located in the second section 711*b* of the guide surface 711 of the first locking member 710 by moving along the first section 711*a* of the guide surface 711 of the first locking member 710. The lever 542 pressed by the pressing part 553 of the rotation member 550 rotates about the lever axis 543. At this time, the second end of the lever 542 pushes the pressing protrusion 522 of the upper catch member 520*a* of the second door opening/closing system 600 upward. Accordingly, the upper catch member 520*a* and the lower catch member 520*b* of the second door opening/closing system 600 connected by the link member 530 are simultaneously separated from the upper lever unit 540*a* and the lower lever unit 540*b*, and the left side of the door 30 becomes openable. The first locking member 710 pressed toward the first door opening/closing system 500 by the push part 554 of the rotation member 550 limits the rotation of the handle 510 of the first door opening/closing system 500 by interfering with the handle 510 of the first door opening/closing system 500. The interference between the pressing protrusion 522 of the catch member 520 and the lever unit 540 is released, and at the same time the first additional locking member 810 moves toward the second door opening/closing system 600 by the elastic member 900. At this time, one end of the first additional locking member 810 interferes with the locking part 523 of the upper catch member 520*a* of the first door opening/closing system 500, so that the upper catch member 520*a* and the lower catch member 520*b* of the first door opening/closing system 500 are prevented from moving in the up-down direction Z of the dryer 1*a*. As a result, when the left side of the door 30 is opened, the right opening of the door 30 is limited by interference between the first locking member 710 and the handle 510 of the first door opening/closing system 500 and interference between the first additional locking member 810 and the upper catch member 520*a* of the first door opening/closing system 500.

Figure 17:
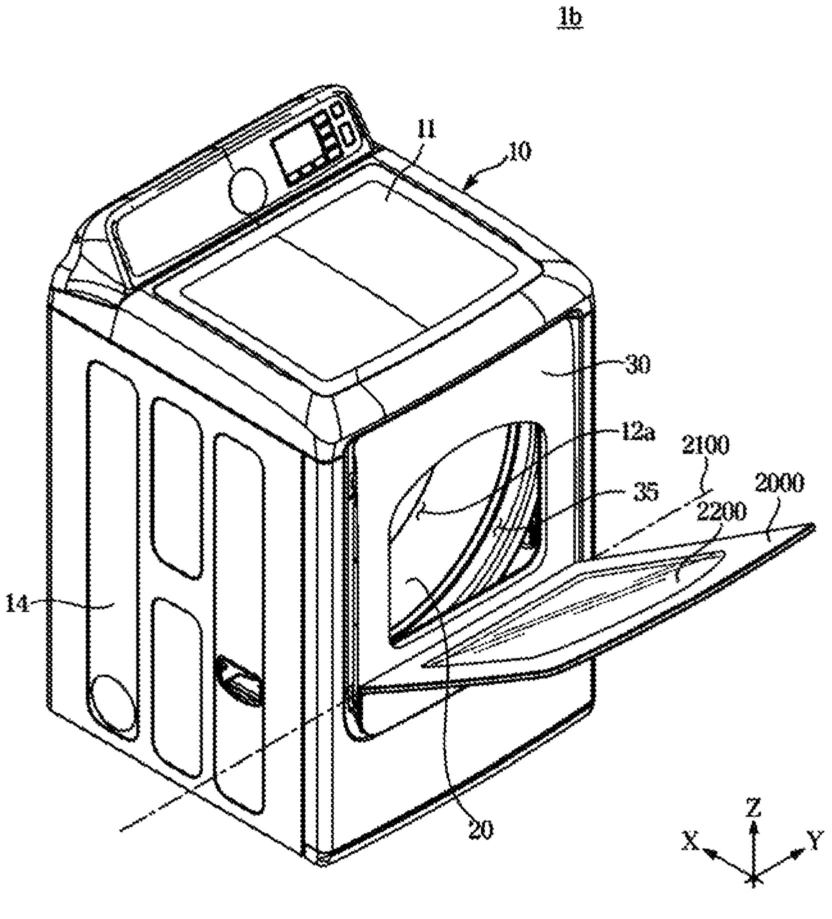
FIG. 17 is a perspective view illustrating a state in which an additional door of a home appliance according to another embodiment of the present disclosure is opened.
Figure 18:
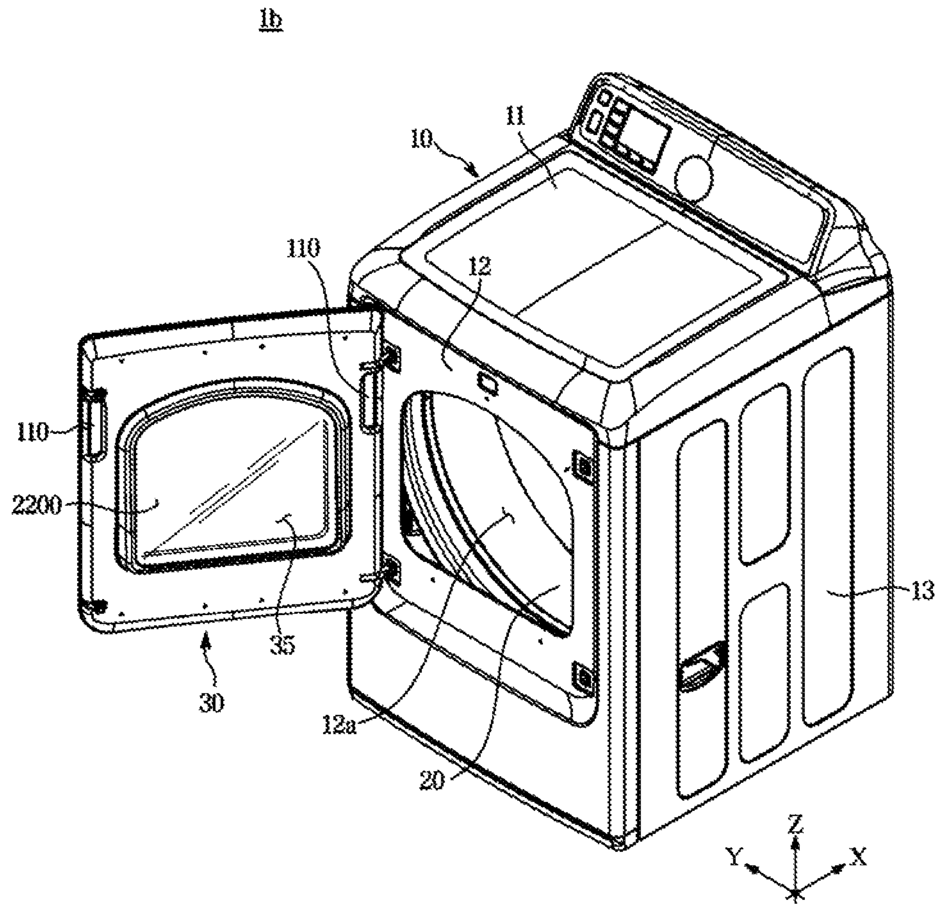
FIG. 18 is a perspective view illustrating a state in which a door of a home appliance according to another embodiment of the present disclosure is opened from the right side.
Figure 19:
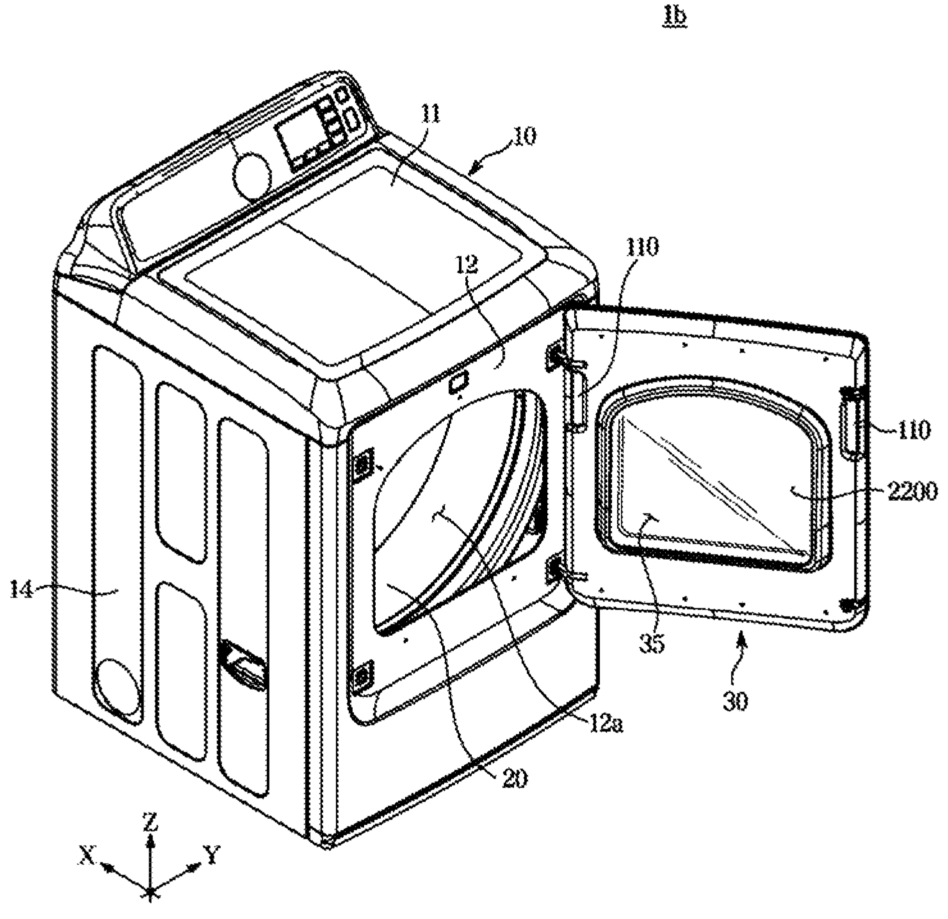
FIG. 19 is a perspective view illustrating a state in which the door of the home appliance according to another embodiment of the present disclosure is opened from the left side.

FIG. 17 is a perspective view illustrating a state in which an additional door of a home appliance according to another embodiment of the present disclosure is opened, FIG. 18 is a perspective view illustrating a state in which a door of a home appliance according to another embodiment of the present disclosure is opened from the right side, FIG. 19 is a perspective view illustrating a state in which the door of the home appliance according to another embodiment of the present disclosure is opened from the left side. For reference, a dryer 1*b* illustrated in FIGS. 17 to 19 has the same overall structure as the dryer 1*a* illustrated in FIGS. 10 to 16 except for the installation of an additional door 2000. Hereinafter, contents overlapping with those described with reference to FIGS. 10 to 16 will be omitted. In addition, reference numerals not indicated refer to FIGS. 10 to 16.

As illustrated in FIGS. 17 to 19, the dryer 1*b* may include the door 30 provided to open and close the inner space of the main body 10. In other words, the dryer 1*b* may include the door 30 provided to open and close the opening 12*a*. The door 30 may be rotatably installed on the right or left side of the main body 10 to open and close the inner space. Specifically, the door 30 may be rotatably installed on the right or left side of the front panel 12 of the main body 10 to open and close the opening 12*a*.

The door 30 may include an opening 35 corresponding to the opening 12*a*. The opening 35 of the door 30 may have a shape corresponding to the opening 12*a*, and may be provided to be in communication with the opening 12*a*. The opening 35 of the door 30 may be opened and closed by the additional door 2000, which will be described later.

The dryer 1*b* may further include the additional door 2000 provided to open and close the inner space of the main body 10 separately from the door 30. The additional door 2000 may be provided to simultaneously open and close the opening 35 of the door 30 and the opening 12*a* of the main body 10.

The additional door 2000 may be coupled to the door 30 to form an appearance of the door 30. Specifically, the additional door 2000 may be coupled to the door 30 to form a front appearance of the door 30.

The additional door 2000 may include a viewing window 2200 formed of at least one of a transparent material and a translucent material so that the user may see the inner space of the main body 10. The viewing window 2200 may have a shape corresponding to the opening 35 of the door 30. However, the viewing window 2200 of the additional door 2000 is sufficient as long as the user may see the inner space of the main body 10 from the outside of the main body 10, and a shape and position thereof may be variously changed.

The additional door 2000 may be rotatably installed on the door 30. Specifically, the additional door 2000 may be rotatably installed on the door 30 to be openable from an upper side or a lower side thereof. One side of the additional door 2000 may be hinged to the door 30. A rotating axis 2100 of the additional door 2000 may be orthogonal to the rotating axis 31 of the door 30 defined by coupling of or interference between the lever unit 540 and the catch member 520. When the upper or lower side of the additional door 2000 is hinged to the door 30, the additional door 2000 may be opened and closed up and down. Suitably, the lower side of the additional door 2000 may be hinged to the door 30 so that the additional door 2000 may be opened from the upper side thereof.

A locking part (not shown) may be formed on the other side of the additional door 2000. The locking part of the additional door 2000 may be detachably inserted into a fixing part (not shown) formed on the door 30. That is, when the locking part of the additional door 2000 is inserted into the fixing part of the door 30, the additional door 2000 may be maintained in a closed state, and when the locking part of the additional door 2000 is separated from the fixing part of the door 30, the additional door 2000 may be opened.

One side of the additional door 2000 hinged to the door 30 may be positioned opposite to the other side of the additional door 2000 on which the locking part is formed. As an example, when the lower side of the additional door 2000 is hinged to the door 30, the locking part may be formed at the upper side of the additional door 2000.

A locking method of the additional door 2000 is not limited to the above example and may be variously changed. As an example, the additional door 2000 may be locked by a magnetic force.

As illustrated in FIG. 17, the additional door 2000 may open and close the inner space of the main body 10 separately from the door 30. That is, in a process in which the additional door 2000 opens and closes the opening 12*a* of the main body 10, the door 30 may be maintained in a closed state.

As illustrated in FIGS. 18 and 19, when the opening 12*a* of the main body 10 is opened and closed by the door 30, the additional door 2000 may move integrally with the door 30. When the door 30 opens and closes the opening 12*a* of the main body 10, the additional door 2000 is coupled to the door 30 and moves integrally with the door 30, and the opening 35 of the door 30 is maintained in a closed state by the additional door 2000.

As described above, as the additional door 2000 is installed in the dryer 1*b*, the usability of the dryer 1*b* may be further improved. The user may easily open and close the opening 12*a* of the main body 10 by opening the door 30 from the left or right or opening the additional door 2000 from the upper or lower side.

In the above, description is made focusing on the case where the additional door 2000 is applied to the dryer 1*a* illustrated in FIGS. 10 to 16, but the additional door 2000 may also be applied to the dryer 1 illustrated in FIGS. 1 to 9.

The foregoing has illustrated and described specific embodiments. However, it should be understood by those of skilled in the art that the present disclosure is not limited to the above-described embodiments, and various changes and modifications may be made without departing from the technical idea of the present disclosure described in the following claims.

The invention claimed is:

1. A home appliance comprising:

a main body having an inner space;

a door installed on a right side of the main body so as to be rotatable, and a left side of the main body so as to be rotatable, the door being selectively openable and closable on the right side of the main body and the left side of the main body to access the inner space;

a first door opening/closing system on the right side of the main body and a right side of the door to open and close the right side of the door;

a second door opening/closing system on the left side of the main body and a left side of the door to open and close the left side of the door;

a first locking member configured to be slidable in a left-right direction by an opening operation of the second door opening/closing system to prevent an opening operation of the first door opening/closing system; and a second locking member configured to be slidable in a left-right direction by the opening operation of the first door opening/closing system to prevent the opening operation of the second door opening/closing system, wherein each of the first door opening/closing system and the second door opening/closing system includes:

a handle installed on the door and configured to be rotatable, and a moving member configured to move in an up-down direction by being interlocked with the handle, and configured so that the first locking member is couplable to the moving member of the first door opening/closing system to prevent the opening operation of the first door opening/closing system, and the second locking member is couplable to the moving member of the second door opening/closing system to prevent the opening operation of the second door opening/closing system, and the first locking member and the second locking member are independently movable by being disposed to cross each other.

2. The home appliance according to claim 1, wherein each of the first door opening/closing system and the second door opening/closing system includes a fixing bracket installed on the main body, the moving member being couplable to the fixing bracket.

3. The home appliance according to claim 2, wherein the fixing bracket includes:

a bracket body fixedly installed on the main body, and an arm extending forward from the bracket body to be exposed to the outside of the main body, the arm having a coupling hole.

4. The home appliance according to claim 3, wherein the moving member includes a protrusion that is couplable to the coupling hole.

5. The home appliance according to claim 4, wherein the protrusion of the moving member is couplable to the coupling hole of the fixing bracket to form a rotating axis of the door.

6. The home appliance according to claim 4, wherein when the handle is rotated forward, the protrusion of the moving member is separated from the coupling hole of the fixing bracket so that the door is openable.

7. The home appliance according to claim 4, wherein the first door opening/closing system includes a first locking inducing member configured to move the second locking member toward the second door opening/closing system by integrally rotating with the door when the right side of the door is opened, and the second door opening/closing system includes a second locking inducing member configured to move the first locking member toward the first door opening/closing system by integrally rotating with the door when the left side of the door is opened.

8. The home appliance according to claim 7, wherein when the right side of the door is opened, the second locking member is pressed by the first locking inducing member so as to be coupled to the moving member of the second door opening/closing system to prevent the moving member of the second door opening/closing system from moving in the up-down direction, and when the left side of the door is opened, the first locking member is pressed by the second locking inducing member so as to be coupled to the moving member of the first door opening/closing system to prevent the moving member of the first door opening/closing system from moving in the up-down direction.

9. The home appliance according to claim 7, wherein a first end of the first locking member is movable along a guide surface formed on the second locking inducing member, and a second end of the first locking member is couplable to the moving member of the first door opening/closing system, and a first end of the second locking member is movable along a guide surface formed on the first locking inducing member, and a second end of the second locking member is couplable to the moving member of the second door opening/closing system.

10. The home appliance according to claim 7, wherein the first locking inducing member includes a contact surface that is inclined to be guided by being in contact with the arm of the fixing bracket of the first door opening/closing system when the right side of the door is opened and closed, and the second locking inducing member includes a contact surface that is inclined to be guided by being in contact with the arm of the fixing bracket of the second door opening/closing system when the left side of the door is opened and closed.

11. The home appliance according to claim 7, wherein the first door opening/closing system includes an elastic body coupled to the first locking inducing member to be elastically deformable according to movement of the first locking inducing member, and the second door opening/closing system includes an elastic body coupled to the second locking inducing member to be elastically deformable according to movement of the second locking inducing member.

12. The home appliance according to claim 1, wherein the handle includes a coupling part configured to interfere with a protrusion of the moving member, the coupling part includes a first section, and a second section extending from the first section to be inclined downward, and the protrusion of the moving member is movable to the first section of the coupling part by moving along the second section when the handle is rotated forward.

13. The home appliance according to claim 1, wherein each of the first door opening/closing system and the second door opening/closing system includes an elastic member disposed between the handle and the moving member to be elastically deformable according to the movement of the moving member.

14. A home appliance comprising:

a main body having an inner space;

a door installed on a right side of the main body so as to be rotatable, and a left side of the main body so as to be rotatable, the door being selectively openable and closable on the right side of the main body and the left side of the main body to access the inner space;

a first door opening/closing system on the right side of the main body and a right side of the door to open and close the right side of the door;

a second door opening/closing system on the left side of the main body and a left side of the door to open and close the left side of the door;

a first locking member configured to be slidable in a left-right direction by an opening operation of the second door opening/closing system to prevent an opening operation of the first door opening/closing system; and a second locking member configured to be slidable in a left-right direction by the opening operation of the first door opening/closing system to prevent the opening operation of the second door opening/closing system, wherein each of the first door opening/closing system and the second door opening/closing system includes:

a handle installed on the door and configured to be rotatable, and a moving member configured to move in an up-down direction by being interlocked with the handle, and configured so that the first locking member is couplable to the moving member of the first door opening/closing system to prevent the opening operation of the first door opening/closing system, and the second locking member is couplable to the moving member of the second door opening/closing system to prevent the opening operation of the second door opening/closing system, the first door opening/closing system includes a first locking inducing member configured to move the second locking member toward the second door opening/closing system by integrally rotating with the door when the right side of the door is opened, the second door opening/closing system includes a second locking inducing member configured to move the first locking member toward the first door opening/closing system by integrally rotating with the door when the left side of the door is opened, a first end of the first locking member is movable along a guide surface formed on the second locking inducing member, and a second end of the first locking member is couplable to the moving member of the first door opening/closing system, and a first end of the second locking member is movable along a guide surface formed on the first locking inducing member, and a second end of the second locking member is couplable to the moving member of the second door opening/closing system.

15. A home appliance comprising:

a main body having an inner space;

a door installed on a right side of the main body so as to be rotatable, and a left side of the main body so as to be rotatable, the door being selectively openable and closable on the right side of the main body and the left side of the main body to access the inner space;

a first door opening/closing system on the right side of the main body and a right side of the door to open and close the right side of the door;

a second door opening/closing system on the left side of the main body and a left side of the door to open and close the left side of the door;

a first locking member configured to be slidable in a left-right direction by an opening operation of the second door opening/closing system to prevent an opening operation of the first door opening/closing system; and a second locking member configured to be slidable in a left-right direction by the opening operation of the first door opening/closing system to prevent the opening operation of the second door opening/closing system, wherein each of the first door opening/closing system and the second door opening/closing system includes:

a handle installed on the door and configured to be rotatable, and a moving member configured to move in an up-down direction by being interlocked with the handle, and configured so that the first locking member is couplable to the moving member of the first door opening/closing system to prevent the opening operation of the first door opening/closing system, and the second locking member is couplable to the moving member of the second door opening/closing system to prevent the opening operation of the second door opening/closing system, each of the first door opening/closing system and the second door opening/closing system includes a fixing bracket installed on the main body, the moving member being couplable to the fixing bracket, the fixing bracket including:

a bracket body fixedly installed on the main body, and an arm extending forward from the bracket body to be exposed to the outside of the main body, the arm having a coupling hole, the first door opening/closing system includes a first locking inducing member configured to move the second locking member toward the second door opening/closing system by integrally rotating with the door when the right side of the door is opened, the second door opening/closing system includes a second locking inducing member configured to move the first locking member toward the first door opening/closing system by integrally rotating with the door when the left side of the door is opened, the first locking inducing member includes a contact surface that is inclined to be guided by being in contact with the arm of the fixing bracket of the first door opening/closing system when the right side of the door is opened and closed, and the second locking inducing member includes a contact surface that is inclined to be guided by being in contact with the arm of the fixing bracket of the second door opening/closing system when the left side of the door is opened and closed.

* * * * *